US007459085B2

(12) United States Patent
Koguma et al.

(10) Patent No.: US 7,459,085 B2
(45) Date of Patent: Dec. 2, 2008

(54) MICROPOROUS HYDROPHILIC MEMBRANE

(75) Inventors: Ichiro Koguma, Yokohama (JP); Fujiharu Nagoya, Yokohama (JP)

(73) Assignee: Asahi Kasei Medical Co., Ltd., Tokyo (JP)

( * ) Notice: Subject to any disclaimer, the term of this patent is extended or adjusted under 35 U.S.C. 154(b) by 609 days.

(21) Appl. No.: 10/531,568

(22) PCT Filed: Oct. 17, 2003

(86) PCT No.: PCT/JP03/13329

§ 371 (c)(1),
(2), (4) Date: Apr. 18, 2005

(87) PCT Pub. No.: WO2004/035180

PCT Pub. Date: Apr. 29, 2004

(65) Prior Publication Data

US 2006/0016748 A1  Jan. 26, 2006

(30) Foreign Application Priority Data

| Oct. 18, 2002 | (JP) | ................. 2002-304766 |
| Dec. 26, 2002 | (JP) | ................. 2002-376767 |
| Jan. 31, 2003 | (JP) | ................. 2003-023709 |

(51) Int. Cl.
*B01D 11/00* (2006.01)
*B01D 39/00* (2006.01)
*B01D 39/14* (2006.01)

(52) U.S. Cl. .................. 210/645; 210/651; 210/500.27; 210/500.36; 210/500.42; 428/310.5; 428/305.5; 428/305.7

(58) Field of Classification Search ............ 210/500.27, 210/500.36, 500.42, 490, 651, 645; 428/310.5, 428/301.5, 305.5, 305.7, 500.5; 427/294; 264/48
See application file for complete search history.

(56) References Cited

U.S. PATENT DOCUMENTS

| 4,247,498 | A | | 1/1981 | Castro |
| 4,399,035 | A | | 8/1983 | Nohmi et al. |
| 4,539,256 | A | | 9/1985 | Shipman |
| 4,618,533 | A | * | 10/1986 | Steuck .................... 428/315.7 |
| 4,808,315 | A | | 2/1989 | Manabe et al. |
| 4,845,132 | A | | 7/1989 | Masuoka et al. |
| 4,937,115 | A | | 6/1990 | Leatherman |
| 4,944,879 | A | * | 7/1990 | Steuck .................. 210/500.27 |
| 5,017,292 | A | | 5/1991 | DiLeo et al. |
| 5,514,461 | A | | 5/1996 | Meguro et al. |
| 5,788,862 | A | * | 8/1998 | Degen et al. ................. 210/651 |
| 6,019,925 | A | | 2/2000 | Diamantoglou et al. |
| 6,096,213 | A | | 8/2000 | Radovanovic et al. |
| 6,096,313 | A | * | 8/2000 | Jager et al. ................ 424/184.1 |
| 6,299,773 | B1 | | 10/2001 | Takamura et al. |
| 6,368,587 | B1 | | 4/2002 | Anders et al. |
| 7,073,671 | B2 | * | 7/2006 | Charkoudian ............... 210/490 |
| 7,108,791 | B2 | * | 9/2006 | Tkacik et al. ............... 210/651 |
| 7,140,496 | B2 | * | 11/2006 | Nagoya et al. ............. 210/490 |
| 7,208,200 | B2 | * | 4/2007 | Kools .......................... 427/294 |
| 7,284,668 | B2 | * | 10/2007 | Charkoudian ............... 210/490 |
| 2003/0209485 | A1 | | 11/2003 | Kools |
| 2004/0023017 | A1 | | 2/2004 | Nagoya et al. |

FOREIGN PATENT DOCUMENTS

| EP | 0 297 744 A2 | 1/1989 |
| EP | 0 302 949 A1 | 2/1989 |
| EP | 0 365 112 A2 | 4/1990 |
| EP | 1 063 256 A1 | 12/2000 |
| EP | 1 206 961 A1 | 5/2002 |
| EP | 1 230 970 A1 | 8/2002 |
| JP | 58-91732 A | 5/1983 |
| JP | 59-16503 A | 1/1984 |
| JP | 59-64640 A | 4/1984 |
| JP | 60-97001 A | 5/1985 |
| JP | 62-179540 | 8/1987 |
| JP | 3-502180 A | 5/1991 |
| JP | 3-228671 | 10/1991 |
| JP | 5-506883 A | 10/1993 |
| JP | A-7-505830 | 6/1995 |
| JP | 7173323 | 7/1995 |
| JP | 7-265674 | 10/1995 |
| JP | A-8-168658 | 4/1998 |
| JP | 2000-15066 A | 1/2000 |
| JP | 2001 157827 | 6/2001 |
| JP | 2001 190940 | 7/2001 |
| WO | WO-91/16968 | 11/1991 |
| WO | WO-93/04223 A1 | 3/1993 |

(Continued)

OTHER PUBLICATIONS

Translation of the International Search Report compiled for the parent PCT application PCT/JP2003/13329.

*Primary Examiner*—Ana M Fortuna
(74) *Attorney, Agent, or Firm*—Dickstein, Shapiro, LLP.

(57) ABSTRACT

A hydrophilic microporous membrane comprising a thermoplastic resin, having been subjected to hydrophilizing treatment and having a maximum pore size of 0 to 100 nm, wherein when 3 wt % bovine immunoglobulin having a monomer ratio of 80 wt % or more is filtered at a constant pressure of 0.3 MPa, an average permeation rate (liter/m²/h) for 5 minutes from the start of filtration (briefly referred to as globulin permeation rate A) satisfies the following formula (1) and an average permeation rate (liter/m²/h) for 5 minutes from the time point of 55 minutes after the start of filtration (briefly referred to as globulin permeation rate B) satisfies the following formula (2):

Globulin permeation rate $A > 0.0015 \times$ maximum pore size $(nm)^{2.75}$     (1)

Globulin permeation rate $B$/globulin permeation rate $A > 0.2$.     (2)

18 Claims, No Drawings

FOREIGN PATENT DOCUMENTS

| | | |
|---|---|---|
| WO | WO-93/22039 | 11/1993 |
| WO | WO 95/23640 A1 | 9/1995 |
| WO | WO-98/39379 A1 | 9/1998 |
| WO | WO 99/47593 | 9/1999 |
| WO | WO 01/05492 A1 | 1/2001 |
| WO | WO-01/14047 A1 | 3/2001 |
| WO | WO 01/28667 A1 | 4/2001 |
| WO | WO 02/102500 | 12/2002 |

\* cited by examiner

MICROPOROUS HYDROPHILIC MEMBRANE

TECHNICAL FIELD

The present invention relates to a hydrophilic microporous membrane suitable for removing microparticles such as viruses.

BACKGROUND ART

Recently in the refining process of a plasma derivative or a biopharmaceutical, there is a need for technology for removing pathogenic agents such as a virus and a pathogenic protein in order to enhance safety. Among the methods for removing pathogenic agents such as a virus is a membrane filtration method. Since the separation operation is conducted, in this membrane filtration method, according to the size of the particles based on the sieve principle, the method is efficacious for all the pathogenic agents irrespective of the type of pathogenic organism as well as the chemical or thermal characteristics of the pathogenic organism. Therefore, industrial utilization of the removal of pathogenic agents using the membrane filtration method has been prevailing in recent years.

Since infection with an infectious virus among pathogenic agents may cause serious diseases, removal of contaminating viruses is highly required. Types of viruses include smallest viruses, such as parvovirus, with a diameter of about 18 to 24 nm, medium-sized viruses, such as Japanese encephalitis virus, with a diameter of about 40 to 45 nm and relatively large viruses, such as HIV, with a diameter of about 80 to 100 nm, etc. In order to remove these virus groups physically by the membrane filtration method, a microporous membrane having a pore size of about 10 to 100 nm is required, and particularly the needs for removing small viruses such as parvovirus are increasing in recent years.

In the meantime, when the membrane filtration method is applied in the refining process of a plasma derivative or a biopharmaceutical, it is desirable not only to enhance the virus removal ability but to allow rapid permeation of a large quantity of physiologically active substances in order to improve productivity.

However, when a subject to be removed is a small virus like parvovirus, since its size is extremely small, as small as 18 to 24 nm, it was difficult to satisfy both of the virus removal performance and the amount and rate of permeation of physiologically active substances by conventional technology.

That is, conventional microporous membranes have drawbacks that they can allow permeation of high-molecular-weight physiologically active substances, such as human immunoglobulin and Factor VIII, at a sufficient permeation rate while they cannot remove small viruses such as parvovirus; or they can remove small viruses such as parvovirus while they cannot allow permeation of high-molecular-weight physiologically active substances, such as human immunoglobulin and Factor VIII, at a substantial permeation rate.

International Publication WO91/16968 pamphlet discloses a process comprising immersing a membrane with a solution containing a polymerization initiator and a hydrophilic monomer, allowing polymerization within micropores, thereby adhering a hydrophilic resin to the surface of the micropores. This method, however, has a defect that the hydrophilic resin merely adheres to the surface of the micropores, and therefore, part of the adhering hydrophilic resin may be dissolved out upon washing out low-molecular weight substances generated in the reaction and hydrophilicity of the membrane may be easily lost. In addition, if a cross-linking agent is used in a large amount and copolymerization is performed in order to prevent dissolution-out, high permeability will not be attained for protein solutions.

JP-A-07-265674 describes a polyvinylidene fluoride film having low adsorptivity for goat immunoglobulin which can effectively remove small particles from a solution. It is described that this film is useful for removing viruses from the solution. According to the Examples thereof, however, this hydrophilic film shows a low adsorptivity for goat immunoglobulin, and does not have sufficient permeability for physiologically active substances such as globulin comparable to the present invention.

JP-A-62-179540 describes a hydrophilic hollow fiber porous membrane comprising a hydrophilic hollow fiber porous membrane composed of polyolefin and side chains containing a neutral hydroxyl group grafted to the membrane. The Examples thereof, however, only describe a hydrophilic microporous membrane having an average pore size of 0.1 to 0.16 µm and does not describe a small pore sized microporous membrane having a maximum pore size of 10 to 100 µm.

JP-A-07-505830 describes a process which comprises irradiating hydrophobic microporous membrane of polyolefin or partially fluorinated polyolefin, etc. with ultraviolet ray and polymerizing a bifunctional monomer which has two reactive groups. According to the above-described method, however, hydrophilicity is lost due to cross-linking in hydrophilic diffusive layer and sufficient filtration rate cannot be attained for a protein solution.

International Publication WO01/14047 pamphlet describes a filtration membrane for physiologically active substances wherein the logarithmic removing ratio for parvovirus is three or more and the permeation ratio for bovine immunoglobulin having a monomer ratio of 80% or more is 70% or more. However, the main membrane disclosed here comprises hollow fibers made of cellulose, and since the mechanical strength when it is wet with water is low, filtration pressure cannot be made high, and therefore, it is very difficult to achieve a high permeation rate.

DISCLOSURE OF THE INVENTION

An object of the present invention is to provide a hydrophilic microporous membrane which has high removing ability for small viruses such as parvovirus, and allows permeation of physiologically active high-molecular-weight substances, such as globulin and Factor VIII, at a high rate and in large quantities.

The present inventors have conducted intensive studies for attaining the above-described object and consequently have completed the present invention.

That is, the present invention is as follows:

1. A hydrophilic microporous membrane comprising a thermoplastic resin, having been subjected to hydrophilizing treatment and having a maximum pore size of 10 to 100 nm, wherein when 3 wt % bovine immunoglobulin having a monomer ratio of 80 wt % or more is filtered at a constant pressure of 0.3 MPa, an average permeation rate (liter/m$^2$/h) for 5 minutes from the start of filtration (briefly referred to as globulin permeation rate A) satisfies the following formula (1) and an average permeation rate (liter/m$^2$/h) for 5 minutes from the time point of 55 minutes after the start of filtration (briefly referred to as globulin permeation rate B) satisfies the following formula (2):

Globulin permeation rate $A > 0.0015 \times$ maximum pore size (nm)$^{2.75}$ \hfill (1)

Globulin permeation rate $B$/globulin permeation rate $A > 0.2$ \hfill (2).

2. The hydrophilic microporous membrane according to the above 1 having a receding contact angle of water of 0 to 20 degrees.

3. The hydrophilic microporous membrane according to the above 1 or 2, wherein a logarithmic reduction value of porcine parvovirus at the time point by which 55 liter/m² has been permeated from the start of filtration is 3 or more.
4. The hydrophilic microporous membrane according to any of the above 1 to 3, wherein both of a logarithmic reduction value of porcine parvovirus at the time point by which 5 liter/m² has been permeated from the start of filtration and a logarithmic reduction value of porcine parvovirus at the time point by which further 5 liter/m² has been permeated after 50 liter/m² is permeated are 3 or more.
5. The hydrophilic microporous membrane according to any of the above 1 to 4, wherein an accumulated permeation volume in three hours after the start of filtration is 50 liter/m² or more when 3 wt % bovine immunoglobulin having a monomer ratio of 80 wt % or more is filtered at a constant pressure of 0.3 MPa.
6. The hydrophilic microporous membrane according to any of the above 1 to 5, wherein the above-described microporous membrane containing a thermoplastic resin is a microporous membrane having a coarse structure layer with a higher open pore ratio and a fine structure layer with a lower open pore ratio, and the above-described coarse structure layer exists on at least one side of the membrane surface and has a thickness of 2 μm or more and the thickness of the above-described fine structure layer is 50% or more of the whole membrane thickness, and the above-described coarse structure layer and the above-described fine structure layer are formed in one piece.
7. The hydrophilic microporous membrane according to the above 6, wherein the thickness of the above-described coarse structure layer is 3 μm or more.
8. The hydrophilic microporous membrane according to the above 6, wherein the thickness of the above-described coarse structure layer is 5 μm or more.
9. The hydrophilic microporous membrane according to any of the above 1 to 8, wherein the above-described thermoplastic resin is polyvinylidene fluoride.
10. The hydrophilic microporous membrane according to any of the above 1 to 9, wherein the above-described hydrophilizing treatment is a graft polymerization reaction of a hydrophilic vinyl monomer having one vinyl group to the surface of the pores of the hydrophilic microporous membrane.
11. The hydrophilic microporous membrane according to the above 10, wherein the above-described hydrophilic vinyl monomer contains a hydroxyl group.
12. The hydrophilic microporous membrane according to any of the above 1 to 11, wherein an adsorption amount per 1 g of the membrane is 3 mg or less when dead-end filtration at a constant pressure of 0.3 MPa is performed using a 0.01 wt % bovine immunoglobulin solution and a filtrate of 50 liter/m² from the start of filtration is collected.
13. The hydrophilic microporous membrane according to any of the above 1 to 12 for use in removing viruses from a liquid containing a physiologically active substance.
14. A hydrophilic microporous membrane, characterized in that both of a logarithmic reduction value of porcine parvovirus at the time point by which 5 liter/m² has been permeated from the start of filtration and a logarithmic reduction value of porcine parvovirus at the time point by which further 5 liter/m² has been permeated after 50 liter/m² is permeated are 3 or more, and when 3 wt % bovine immunoglobulin having a monomer ratio of 80 wt % or more is filtered at a constant pressure of 0.3 MPa, an average permeation rate (liter/m²/h) for 5 minutes from the start of filtration (briefly referred to as globulin permeation rate A) satisfies the following formula (1) and an average permeation rate (liter/m²/h) for 5 minutes from the time point of 55 minutes after the start of filtration (briefly referred to as globulin permeation rate B) satisfies the following formula (2):

$$\text{Globulin permeation rate } A > 0.0015 \times \text{maximum pore size (nm)}^{2.75} \quad (1)$$

$$\text{Globulin permeation rate } B/\text{globulin permeation rate } A > 0.2 \quad (2).$$

BEST MODE FOR CARRYING OUT THE INVENTION

The maximum pore size of the hydrophilic microporous membrane of the present invention measured by the bubble point method is preferably 10 nm or more and more preferably 15 nm or more from the viewpoint of permeability of physiologically active substances such as globulin and filtration rate. The upper limit of the maximum pore size measured by the bubble point method is preferably 100 nm or less, and although it varies depending on the size of the virus and the like to be removed, it is preferably 70 nm or less for removing medium-sized viruses such as Japanese encephalitis virus, and particularly 36 nm or less when the object to be removed is a small virus such as parvovirus. The maximum pore size as used herein is the value measured by the bubble point method based on ASTM F316-86.

It is preferable that a skin layer does not exist on the surface of the hydrophilic microporous membrane of the present invention. If a skin layer exists, suspending substances contained in the solution containing physiologically active substances such as protein accumulate on the membrane surface, and accordingly a rapid fall in the permeation capability may occur. The skin layer as used herein refers to a layer which exists adjacent to the membrane surface, and whose pore size is smaller compared with the inside of the membrane, and the thickness thereof is usually 1 μm or less.

The hydrophilic microporous membrane of the present invention has an average permeation rate (liter/m²/h) for 5 minutes from the start of filtration (hereinafter briefly referred to as globulin permeation rate A) when 3 wt % bovine immunoglobulin having a monomer ratio of 80 wt % or more is filtered at a constant pressure of 0.3 MPa which satisfies the following formula (1):

$$\text{Globulin permeation rate } A > 0.0015 \times \text{maximum pore size (nm)}^{2.75} \quad (1).$$

That is, the globulin permeation rate A of the hydrophilic microporous membrane of the present invention should be more than $0.0015 \times \text{maximum pore size (nm)}^{2.75}$, preferably not less than $0.0015 \times \text{maximum pore size (nm)}^{2.80}$, more preferably not less than $0.0015 \times \text{maximum pore size (nm)}^{2.85}$, most preferably not less than $0.0015 \times \text{maximum pore size (nm)}^{2.90}$. When the globulin permeation rate A is more than $0.0015 \times \text{maximum pore size (nm)}^{2.75}$, sufficient permeation rate to carry out removing of viruses in the production of plasma derivatives, biopharmaceuticals, etc. on an industrial scale is securable.

In addition, the hydrophilic microporous membrane of the present invention should have a globulin permeation rate A and an average permeation rate (liter/m²/h) for 5 minutes from the time point of 55 minutes after the start of filtration (hereinafter briefly referred to as globulin permeation rate B) when 3 wt % bovine immunoglobulin having a monomer ratio of 80 wt % or more is filtered at a constant pressure of 0.3 MPa which satisfies the following formula (2):

$$\text{Globulin permeation rate } B/\text{globulin permeation rate } A > 0.2 \quad (2).$$

In the hydrophilic microporous membrane of the present invention, globulin permeation rate B/globulin permeation rate A (hereinafter briefly referred to as the ratio of filtration rates) is preferably 0.3 or more, and more preferably 0.4 or more. If the ratio of filtration rate is more than 0.2, filtration rate can be kept sufficiently and removing of viruses in the production of plasma derivatives, biopharmaceuticals, etc. on an industrial scale is carried out.

The hydrophilic microporous membrane of the present invention preferably has a logarithmic reduction value of porcine parvovirus at the time point by which 55 liter/m$^2$ has been filtered from the start of filtration (hereinafter referred to as the 0 to 55 liter/m$^2$ filtered time) is 3 or more, and more preferably 3.5 or more, and most preferably 4 or more. When logarithmic reduction value of porcine parvovirus at the 0 to 55 liter/m$^2$ filtered time is 3 or more, it can be equal to the use as a virus removal filter for removing small viruses such as human parvovirus B19 and poliomyelitis virus from a solution containing physiologically active substances. Furthermore, the fact that small viruses such as human parvovirus B19 and poliomyelitis virus can be removed means that larger viruses such as hepatitis C and HIV can be removed with still higher probability.

In addition, although a virus concentration in a filtrate may vary depending on a filtered volume, a membrane with no or a small, if any, decreasing ratio in the virus removal ability as the filtered volume increases is naturally desired. The hydrophilic microporous membrane of the present invention preferably has both of the logarithmic reduction value of porcine parvovirus at the time point by which 5 liter/m$^2$ has been filtered from the start of filtration (hereinafter referred to as the 0 to 5 liter/m$^2$ filtered time) and the logarithmic reduction value of porcine parvovirus at the time point by which further 5 liter/m$^2$ has been filtered after 50 liter/m$^2$ is filtered (hereinafter referred to as the 50 to 55 liter/m$^2$ filtered time) of 3 or more, and more preferably 3.5 or more, and most preferably 4 or more. The fact that each of the porcine parvovirus at 0 to 5 liter/m$^2$ filtered time and 50 to 55 liter/m$^2$ filtered time is 3 or more can be regarded as an index showing that persistency of the virus removal ability of the membrane is sufficiently high.

Proteins in a plasma derivative or a biopharmaceutical are liable to be adsorbed to a hydrophobic membrane, in other words, they are hardly adsorbed to a hydrophilic membrane, and the hydrophilicity of the membrane can be estimated by contact angle of water. There are two methods for measuring contact angle, static contact angle method and dynamic contact angle method, and the dynamic contact angle method, which provides information on surface dynamics, is preferable. Among the dynamic contact angle methods, the measuring method according to the Wilhelmy method with high flexibility of sample form is more preferable.

Among the contact angles of water, receding contact angle of water serves as an important index for estimating the hydrophilicity of the membrane, since the receding contact angle directly reflects the hydrophilicity of the membrane surface in water. The hydrophilic microporous membrane of the present invention preferably has a receding contact angle of water of 0 to 20 degrees, more preferably 0 to 15 degrees, still more preferably 0 to 10 degrees and most preferably 0 to 5 degrees. When the receding contact angle of water exceeds 20 degrees, the hydrophilicity of the membrane is insufficient and a rapid fall of the filtration rate will be caused by adsorption of protein.

Although the form of hydrophilic microporous membrane of the present invention is applicable in any form including a flat membrane, a hollow fiber, etc., hollow fiber is preferable from the viewpoint of easiness of production.

The membrane thickness of hydrophilic microporous membrane of the present invention is preferably 15 μm to 1000 μm, more preferably 15 μm to 500 μm, and most preferably 20 μm to 100 μm. When the membrane thickness is 15 μm or more, not only strength of the microporous membrane is sufficient but also certainty in virus removal is sufficient. Membrane thickness exceeding 1000 μm is not preferable since the permeation capability tends to fall.

The porosity of hydrophilic microporous membrane in the present invention is 20 to 90%, preferably 30 to 85%, and more preferably 40 to 80%. When the porosity is less than 20%, filtration rate is not enough and when the porosity exceeds 90%, there is a tendency that the certainty of virus removal decreases and the strength of microporous membrane becomes insufficient and therefore it is not preferable.

Although water permeativity of the hydrophilic microporous membrane of the present invention varies depending on the pore size, it is preferably $2\times10^{-11}$ to $3\times10^{-8}$, more preferably $4\times10^{-11}$ to $1.5\times10^{-8}$, most preferably $5\times10^{-11}$ to $8.5\times10^{-9}$. The unit of the water permeativity is m$^3$/m$^2$/second/Pa. When the water permeativity is $2\times10^{-11}$ or more, water permeativity sufficient for use as a separation membrane can be obtained and therefore it is preferable. On the other hand, in consideration of keeping the strength of hydrophilic microporous membrane or securing the certainty of virus removal, water permeativity exceeding $3\times10^{-8}$ is not realistic.

The surface of the hydrophilic microporous membrane of the present invention and the surface of the micropores preferably show low adsorptivity for proteins such as globulin. The degree of adsorptivity can be evaluated by permeating a diluted solution of globulin which is a typical plasma protein, and quantifying the proteins contained in the unfiltered solution and the filtrate by absorption spectrometer. The amount of adsorption per 1 g of membrane when a bovine immunoglobulin solution diluted to 100 mass ppm is made to permeate is 3 mg or less, more preferably 2 mg or less, and most preferably 1 mg or less.

As for the hydrophilic microporous membrane of the present invention, it is preferable that the maximum pore size is 10 to 100 nm and the structure of the microporous membrane is not limited as long as it satisfies the following formula (1) and formula (2). It is preferable, however, that the microporous membrane has a coarse structure layer with a higher open pore ratio and a fine structure layer with a lower open pore ratio, and the above-described coarse structure layer exists on at least one side of the membrane surface and has a thickness of 2 μm or more and the thickness of the above-described fine structure layer is 50% or more of the whole membrane thickness, and the above-described coarse structure layer and the above-described fine structure layer are formed in one piece. This is because such a structure facilitates to secure the initial filtration rate satisfying the formula (1) and to keep the filtration rate satisfying the formula (2).

Globulin permeation rate $A > 0.0015 \times$ maximum pore size (nm)$^{2.75}$     (1)

Globulin permeation rate $B$/globulin permeation rate $A > 0.2$     (2).

Microporous membranes having a preferable structure will be described below.

In the above-described microporous membrane, the coarse structure layer preferably exists on at least one side of the membrane surface and the thickness of the coarse structure layer is preferably 2 μm or more, more preferably 3 μm or more, still more preferably 5 μm or more and particularly preferably 8 μm or more. The coarse structure layer has a pre-filter function, and alleviates decrease in the filtration rate due to the blockade by impurities. As the pore size of microporous membrane is smaller, impurities contained in physiologically active substances may more readily cause decrease in the filtration rate, and thus the thickness of the coarse structure layer is preferably large.

In the meantime, the thickness of the fine structure layer is preferably 50% or more of the whole membrane thickness. When the thickness of the fine structure layer is 50% or more of the whole membrane thickness, it can be used without reducing removing performance such as for viruses. It is more preferably 55% or more, and particularly preferably 60% or more.

The above-described coarse structure layer is a part where open pore ratio is relatively large in the whole membrane thickness and improves processing performance of the membrane by exhibiting a pre-filter function on the suspending substances contained in a protein solution or the like. On the other hand, the above-described fine structure layer is a part where open pore ratio is relatively small in the whole membrane thickness and substantially defines the membrane pore size. It is the layer which has the function of removing particles in a microporous membrane to remove particles such as viruses.

Both of the porosity and the open pore ratio respectively correspond to the capacity ratio of the pored portion in the microporous membrane of the present invention and they are the same in the basic concept but the porosity is a numerical value obtained from an apparent volume calculated from the cross-sectional area across the membrane and the length and the mass of the membrane and the true density of the membrane material, whereas the open pore ratio is an area ratio of the pored portions to the cross-sectional area of the membrane in the cross-section of the membrane, which can be determined from the image analysis of the electron microscope photograph of the cross-section of the membrane. In the present invention, open pore ratio is measured for every predetermined thickness in the membrane thickness direction in order to investigate changes in the capacity ratio of the pored portions in the membrane thickness direction, and it is measured for every 1 μm thickness in consideration of measurement accuracy.

Specifically, the open pore ratio is an average open pore ratio determined by dividing observation result of the cross-sectional structure in the direction perpendicular to the membrane surface of the microporous membrane for every 1 μm thickness in the thickness direction, determining the open pore ratio by image-processing analysis for each of the divided regions and averaging these open pore ratios for a predetermined membrane thickness region, and the average open pore ratio of the whole membrane thickness is a open pore ratio which is determined by averaging the open pore ratios obtained for each of the divided regions throughout the whole membrane thickness.

In the present invention, the coarse structure layer is a layer with a higher open pore ratio which exists adjacent to the membrane surface, and preferably it is a layer in which (A) open pore ratio is the average open pore ratio of the whole membrane thickness+2.0% or more (hereinafter referred to as the coarse structure layer of (A)), more preferably+2.5% or more of layer, particularly preferably+3.0% or more. The upper limit of the open pore ratio of the coarse structure layer is preferably the average open pore ratio of the whole membrane thickness+30% or less, more preferably the average open pore ratio of the whole membrane thickness+25% or less, particularly preferably the average open pore ratio of the whole membrane thickness+20% or less. When the open pore ratio of the coarse structure layer is the average open pore ratio of the whole membrane thickness+2.0% or more, the structural difference from the fine structure layer is also sufficiently large, which allows to exhibit pre-filtering effect and provides an effect of increasing the processing performance of the microporous membrane. On the other hand, when the open pore ratio of the coarse structure layer is more than the average open pore ratio of the whole membrane thickness+30%, the structure of the coarse structure layer is unnecessarily coarse and may have only insufficient pre-filter function and therefore it is not preferable.

Furthermore, the coarse structure layer preferably has a gradient structure where the open pore ratio decreases continuously from the membrane surface to the fine structure layer. The reason why this is preferable is that the pore size decreases continuously as the open pore ratio decreases continuously, thereby large suspending substances are removed near the surface and smaller suspending substances are gradually removed as going deeper into the inside and thus the pre-filter function of the coarse structure layer is improved. It is not preferable that the open pore ratio changes a lot discontinuously on the boundary between the coarse structure layer and the fine structure layer since the suspending substances accumulate near the boundary and cause decrease in the filtration rate. The gradient structure where the open pore ratio decreases continuously as used herein means an overall tendency in the membrane thickness direction, and there may be some local inversions of the open pore ratio resulting from structural variation or measurement errors.

The coarse structure layer preferably contains a layer where the open pore ratio is the average open pore ratio of the whole membrane thickness+5.0% or more, and still more preferably contains a layer where the open pore ratio is the average open pore ratio of the whole membrane thickness+8.0% or more. When the coarse structure layer contains a layer where the open pore ratio is the average open pore ratio of the whole membrane thickness+5.0% or more, it means that the coarse structure layer has a layer having a sufficiently larger pore size than the fine structure layer, the coarse structure layer can exhibit sufficient pre-filter function. The layer which has the maximum open pore ratio is preferably present on the membrane surface or near the membrane surface.

In addition, the average pore size on the surface of the membrane to which the coarse structure layer is adjacent in the microporous membrane is preferably twice more the maximum pore size determined by the bubble point method, and more preferably three times more the maximum pore size determined by the bubble point method. If the average pore size on the surface of the membrane to which the coarse structure layer is adjacent is below twice the maximum pore size determined by the bubble point method, the pore size is too small and there is a tendency that suspending substances deposit on the surface to cause decrease in the filtration rate, which is not preferable. When the microporous membrane is used for removing particles such as viruses, the average pore size on the surface of the membrane to which the coarse structure layer is adjacent is preferably 3 μm or less, more preferably 2 μm or less. If the above-described average pore size exceeds 3 μm, there is a tendency that the pre-filter function deteriorates, which is not preferable.

The fine structure layer is a layer with a lower open pore ratio, and preferably it is a layer in which (B) open pore ratio is less than the average open pore ratio of the whole membrane thickness+2.0% and in the range of (the average value of the open pore ratio of the layer in which the open pore ratio is less than the average open pore ratio of the whole membrane thickness+2.0%)±2.0% (including both the ends) (hereinafter referred to as the fine structure layer of (B)). The fact that the open pore ratio of the fine structure layer is in the range of (the average value of the open pore ratio of the layer in which the open pore ratio is less than the average open pore ratio of the whole membrane thickness+2.0%)±2.0% (including both the ends) means that the fine structure layer has a relatively homogeneous structure, and this is important for removing a virus or the like by depth filtration. The higher the homogeneity of the fine structure layer, the more preferable, and the range of variation of the open pore ratio is preferably within the range of ±2%, still more preferably within the range of ±1%. As an example of structure of the fine structure layer, the void structure in spherocrystal disclosed in the International Publication WO01/28667 pamphlet can be preferably applied.

An intermediate region belonging to neither the above-described coarse structure layer of (A) nor the fine structure layer of (B) may also exist in the microporous membrane. The intermediate region as used herein corresponds to a layer where the open pore ratio is less than the average open pore ratio of the whole membrane thickness+2.0% but does not fall in the range of (the average value of the open pore ratio of the layer in which the open pore ratio is less than the average open pore ratio of the whole membrane thickness+2.0%)±2.0% (including both the ends). Such a layer usually exists in the boundary portions between the coarse structure layer of (A) and the fine structure layer of (B).

As for the microporous membrane, it is preferable that the coarse structure layer and the fine structure layer are formed in one piece. The expression that the coarse structure layer and the fine structure layer are formed in one piece means that the coarse structure layer and the fine structure layer are simultaneously formed at the time of production of the microporous membrane. Under the present circumstances, an intermediate region may exist in the boundary portions between the coarse structure layer and the fine structure layer. As compared to a membrane produced by coating a comparatively small pore sized layer on the large pore sized support or a laminated membrane comprising laminated membranes having different pore sizes, it is more preferable that the coarse structure layer and the fine structure layer are formed in one piece. The membrane produced by coating and the laminated membrane comprising laminated membranes having different pore sizes, in which the connectivity of the pores becomes low or the pore size changes discontinuously a lot between two layers, have defects that suspending substances tend to deposit between the support and the coating layer.

The process for producing a hydrophilic microporous membrane of the present invention will be described below.

The thermoplastic resin used for producing a microporous membrane of the present invention is a thermoplastic resin having crystallizing properties which is used for usual compression, extrusion, ejection, inflation and blow moldings and polyolefin resins such as polyethylene resin, polypropylene resin and poly 4-methyl-1-pentene resin; polyester resins such as polyethylene terephthalate resin, polybutylene terephthalate resin, polyethylene terenaphthalate resin, polybutylene naphthalate resin, polycyclohexylenedimethylene terephthalate resin; polyamide resins such as nylon 6, nylon 66, nylon 610, nylon 612, nylon 11, nylon 12, and nylon 46; fluoride resins such as polyvinylidene fluoride resin, ethylene/tetrafluoroethylene resin and polychlorotrifluoroethylene resin; polyphenylene ether resins; and polyacetal resins, etc. can be used.

Among the above-described thermoplastic resins, polyolefin resins and fluoride resins have good balance of heat resistance and molding processability and therefore they are preferable, and inter alia polyvinylidene fluoride resins are particularly preferable. The polyvinylidene fluoride resin as used herein refers to a fluoride resin containing vinylidene fluoride units as a backbone structure, and is generally referred to by the abbreviated name of PVDF. As such a polyvinylidene fluoride resin, a homopolymer of vinylidene fluoride (VDF), a copolymer of one or two monomers selected from the monomer group consisting of hexafluoropropylene (HFP), pentafluoropropylene (PFP), tetrafluoroethylene (TFE), chlorotrifluoroethylene (CTFE) and perfluoromethyl vinyl ether (PFMVE) with vinylidene fluoride (VDF) can be used. The above-described homopolymer and the above-described copolymer can also be mixed and used.

In the present invention, polyvinylidene fluoride resin containing 30 to 100 wt % of a homopolymer is preferably used since the crystallinity of the microporous membrane will be improved and the strength thereof will become high, and it is still more preferable to use only homopolymer.

The average molecular weight of the thermoplastic resin used in the present invention is preferably 50,000 to 5,000,000, more preferably 100,000 to 2,000,000, still more preferably 150,000 to 1,000,000. Although this average molecular weight indicates weight average molecular weight obtained by gel permeation chromatography (GPC) measurement, since correct GPC measurement is generally difficult for a resin having an average molecular weight exceeding 1,000,000, viscosity average molecular weight by the viscosity method can be adopted instead thereof. If the weight average molecular weight is smaller than 50,000, the melt tension during melt molding becomes small, with the result that shapability will be deteriorated or the membranous mechanical strength will become low, and therefore it is not preferable. If the weight average molecular weight exceeds 5,000,000, uniform melt-blending becomes difficult, and therefore it is not preferable.

The polymer concentration of the thermoplastic resin used in the present invention is preferably 20 to 90 wt %, more preferably 30 to 80 wt %, and most preferably 35 to 70 wt % in the composition containing a thermoplastic resin and a plasticizer. If the polymer concentration becomes less than 20 wt %, problems will occur, for example, membrane forming properties are deteriorated and sufficient mechanical strength cannot be obtained. In addition, pore size of the microporous membrane obtained becomes too large as a membrane for removing viruses, and the virus removal performance becomes insufficient. If the polymer concentration exceeds 90 wt %, the porosity becomes small while the pore size of microporous membrane obtained becomes too small, and therefore the filtration rate decreases and the membrane cannot be used practically.

As a plasticizer used in the present invention, a non-volatile solvent which can form a uniform solution at a temperature not less than the melting point of the crystal of a thermoplastic resin when the plasticizer is mixed with the thermoplastic resin with a composition for producing a microporous membrane is used. The non-volatile solvent here has a boiling point of 250° C. or more under atmospheric pressure. The form of a plasticizer may be a liquid or a solid generally at a normal temperature of 20° C. It is preferable to use a plasticizer of so-called solid-liquid phase separation system for producing a membrane which has a small pore sized and homogeneous fine structure layer to be used for virus removal, which plasticizer has a thermally induced solid-liquid phase separation point at a temperature not lower than normal temperature when a uniform solution with thermoplastic resin is cooled. Some plasticizers have a thermally induced liquid-liquid phase separation point at a temperature not lower than normal temperature when a uniform solution with a thermoplastic resin is cooled but generally the use of a plasticizer of liquid-liquid phase separation system tends to form obtained microporous membrane in large pore sizes. The plasticizer used here may be a single substance or a mixture of two or more substances.

The method for measuring a thermally induced solid-liquid phase separation point may comprise using as a sample a composition containing a thermoplastic resin and a plasticizer of the predetermined concentration and melt-blended beforehand, and measuring the exothermic peak temperature of this resin by thermal analysis (DSC). The method of measuring the crystallizing point of this resin may also comprise using as a sample the resin melt-blended beforehand, and conducting thermal analysis in a similar manner.

As a plasticizer used preferably for the production of a membrane which has a small pore sized and homogeneous fine structure layer and is used for virus removal, a plasticizer disclosed in International Publication WO01/28667 pamphlet can be mentioned. That is, a plasticizer for which a depression constant of the phase separation point of the composition defined by the following formula is 0 to 40° C., preferably 1 to 35° C., still more preferably 5 to 30° C. can be mentioned. If the depression constant of the phase separation point exceeds 40° C., homogeneity of the pore size and strength are deteriorated and therefore such a plasticizer is not preferable.

$$\alpha = 100 \times (T_c^0 - T_c)/(100 - C)$$

wherein α represents a depression constant of the phase separation point (° C.), $T_c^0$ represents a crystallizing temperature (° C.) of the thermoplastic resin, $T_c$ represents a thermally induced solid-liquid phase separation point (° C.) of the composition and C represents a concentration (wt %) of the thermoplastic resin in the composition.

For example, when polyvinylidene fluoride resin is selected as a thermoplastic resin, dicyclohexyl phthalate (DCHP), diamyl phthalate(DAP), triphenyl phosphate (TPP), diphenylcresyl phosphate (CDP), tricresyl phosphate (TCP), etc. are particularly preferable.

In the present invention, the first method for carrying out uniform dissolution of the composition containing a thermoplastic resin and a plasticizer is a method comprising feeding the resin into a continuous resin blending machine such as an extruder, introducing a plasticizer in an arbitrary ratio while heat melting the resin and carrying out screw blending to obtain a uniform solution. The form of the resin to be fed may be in any shape of a powder, a granule and a pellet. When carrying out the uniform dissolution by this method, the form of the plasticizer is preferably a liquid at a normal temperature. As an extruder, a single axis screw extruder, two-axis opposite direction screw extruder, two-axis same direction screw extruder, etc. can be used.

The second method of carrying out uniform dissolution of the composition containing a thermoplastic resin and a plasticizer is a method comprising mixing and dispersing a plasticizer in a resin beforehand using a churning equipment such as a Henschel mixer and feeding the resultant composition into a continuous resin blending machine such as an extruder and carrying out melt-blending to obtain a uniform solution. The form of the composition to be fed may be in a shape of slurry when the plasticizer is a liquid at normal temperature, and in a shape of a powder, a granule or the like when the plasticizer is a solid at normal temperature.

The third method of carrying out uniform dissolution of the composition containing a thermoplastic resin and a plasticizer is a method of using a simple form resin blending machine such as a brabender and a mill, and a method of melt-blending within a blending container of the other batch type. According to these methods, it cannot be said that productivity is good since they are batch type processes, but there is an advantage that they are simple and highly flexible.

In the present invention, after the composition containing a thermoplastic resin and a plasticizer is heated to a temperature not lower than the melting point of the crystal of the thermoplastic resin to form a uniform solution, the composition is extruded in the form of a flat membrane or a hollow fiber from a discharging orifice such as a T-die, a circular die and an annular spinneret, and cooled to solidification to shape a membrane form (step (a)). In the step (a) in which the composition is cooled to solidification to shape a membrane form, the fine structure layer is formed while the coarse structure layer is formed adjacent to the membrane surface.

In the present invention, the composition containing a thermoplastic resin and a plasticizer which is heated and uniformly dissolved is discharged from a discharging orifice and the membrane is taken over at a taking-over rate so that the draft ratio defined below may be not less than 1 and not more than 12, while a non-volatile liquid heated to 100° C. or more which is capable of partially solubilizing the thermoplastic resin is contacted with one membrane surface and the other side of the membrane is cooled to form a coarse structure layer and a fine structure layer.

Draft ratio=(membrane taking-over rate)/(discharging rate of the composition at the discharging orifice)

The above-described draft ratio is preferably not less than 1.5 and not more than 9, more preferably not less than 1.5 and not more than 7. If the draft ratio is less than 1, no tension is loaded on the membrane and the shapability is poor and if it exceeds 12, the membrane is extended and therefore it is difficult to form a coarse structure layer having a sufficient thickness. The discharging rate of the composition at the discharging orifice as used herein is given by the following formula:

Discharging rate of the composition at the discharging orifice=(volume of composition discharged per unit time)/(area of discharging orifice)

The preferable range of the discharging rate is 1 to 60 m/min, more preferably 3 to 40 m/min. When the discharging rate is less than 1 m/min, problems occur such as increase in fluctuation of the discharging volume in addition to decrease in productivity. On the contrary, if the discharging rate exceeds 60 m/min, since there is much discharging volume, a turbulent flow may occur at the discharging orifice, and the discharging state may become unstable.

Although the taking-over rate can be set according to the discharging rate, it is preferably 1 to 200 m/min, more preferably 3 to 150 m/min. If the taking-over rate is less than 1 m/min, productivity and shapability are deteriorated, and if the taking-over rate exceeds 200 m/min, cooling time becomes short, tension loaded on the membrane increases and accordingly rupture of the membrane tends to occur.

A preferable method of forming a coarse structure layer is a method in which one side of the surfaces of uncured membrane formed by extruding the composition containing a thermoplastic resin and a plasticizer from the extruding orifice into a membrane of the shape of a flat membrane or a hollow fiber is contacted with a non-volatile liquid which is capable of partially solubilizing the thermoplastic resin. In this case, a coarse structure layer is formed by diffusion of the contacted liquid inside the membrane and a partial dissolution of the thermoplastic resin. The liquid which is capable of partially solubilizing the thermoplastic resin as used herein is a liquid which cannot form a uniform solution unless the temperature is elevated to 100° C. or more when it is mixed with the thermoplastic resin in 50 wt % concentration, and preferably it is a liquid which can form a uniform solution at a temperature not lower than 100° C. and not higher than 250° C., and more preferably it is a liquid which can form a uniform solution at a temperature not lower than 120° C. and not higher than 200° C. If the liquid which can achieve uniform dissolution at a temperature lower than 100° C. is used as a contact liquid, cooling solidification of the composition solution containing a thermoplastic resin and a plasticizer is prevented, and consequently problems may occur, for example, shapability may be deteriorated, the coarse structure layer may become unnecessarily thick, or the pore size becomes excessively large. In the case of the liquid which cannot form a uniform solution at a temperature lower than 250° C., the solubility of the thermoplastic resin is too low, and it is difficult to form a coarse structure layer having a sufficient thickness. The non-volatile liquid as used herein is a liquid having a boiling point exceeding 250° C. under 101325 Pa.

For example, when polyvinylidene fluoride resin is selected as a thermoplastic resin, phthalic acid esters, adipic acid esters and sebacic acid esters in which the carbon chain length of the ester chain is seven or less, phosphoric acid esters and citric acid esters in which the carbon chain length of the ester chain is eight or less can be preferably used, and particularly, diheptyl phthalate, dibutyl phthalate, diethyl phthalate, dimethyl phthalate, dibutyl adipate, dibutyl sebacate, tri(2-ethylhexyl) phosphate, tributyl phosphate, acetyltributyl citrate, etc. can be used suitably.

However, plasticizers having an annular structure such as a phenyl group, a cresyl group, a cyclohexyl group, etc. in the ester chain, i.e., dicyclohexyl phthalate, (DCHP), diamyl phthalate(DAP), triphenyl phosphate (TPP), diphenylcresyl phosphate (CDP), tricresyl phosphate (TCP), etc. do have exceptionally poor capability to form a coarse structure layer and they are not preferable.

The temperature of the contacting liquid used to introduce a coarse structure layer is a temperature not lower than 100° C., preferably not lower than 120° C., and not higher than the temperature of the uniform solution of a thermoplastic resin and a plasticizer, still more preferably a temperature not lower than 130° C., and not higher than (the temperature of the uniform solution of a thermoplastic resin and a plasticizer—10° C.). If the temperature of the contacting liquid is lower than 100° C., the solubility of the thermoplastic resin is too low, and therefore it tends to be difficult to form a coarse structure layer having a sufficient thickness. If the temperature exceeds the temperature of the uniform solution of the thermoplastic resin and the plasticizer, shapability is deteriorated.

When a coarse structure layer is introduced only on one side of the microporous membrane, the cooling method of the surface of the other side corresponding to the fine structure layer side can follow any conventional method. That is, it can be carried out by contacting a heat conducting object to effect cooling. As the heat conducting object, metal, water, air, or the plasticizer itself can be used. Specifically, a method of introducing a coarse structure layer is possible which comprises extruding a uniform solution containing a thermoplastic resin and a plasticizer in the shape of a sheet through a T-die etc., carrying out contact cooling with a metal roll, and bringing the other side of the membrane which does not contact with the roll into contact with a non-volatile liquid which is capable of partially solubilizing the thermoplastic resin. Alternatively a method is possible which comprises extruding a uniform solution containing a thermoplastic resin and a plasticizer in the shape of a cylinder or a hollow fiber through a circular die, annular spinneret, etc., and passing a non-volatile liquid which is capable of partially solubilizing the thermoplastic resin through inside the cylinder or hollow fiber to form a coarse structure layer in the inner surface side while contacting the outside with a cooling media such as water to effect cooling.

When the coarse structure layer is introduced on both the sides of the microporous membrane, a uniform solution containing a thermoplastic resin and a plasticizer is extruded in a predetermined shape through a T-die, a circular die, annular spinneret, etc., a circular die, annular spinneret, and the solution is contacted with a non-volatile liquid which is capable of partially solubilizing the thermoplastic resin on both the sides to form a coarse structure layer, which is then cooled to solidification. Cooling method in this process can follow any conventional method. When the time after contacting the non-volatile liquid which is capable of partially solubilizing the thermoplastic resin until the cooling starts is too long, problems may occur, for example, shapability may be deteriorated, the strength of the membrane is deteriorated, etc., and therefore the time period after contacting the contacting liquid till the start of the cooling is preferably 30 seconds or less, more preferably 20 seconds or less, and particularly preferably 10 seconds or less.

In the production method of the microporous membrane of the present invention, in order to form a small pore sized and homogeneous fine structure layer, it is preferable to make the cooling rate at the time of effecting cooling solidification sufficiently high. The cooling rate is preferably 50° C./min or more, more preferably 100 to $1 \times 10^{5}$° C./min, still more preferably 200 to $2 \times 10^{4}$° C./min. Specifically, the method of contacting with a metal cooling roll and water is preferably used, and particularly, the method of contacting with water is preferable since it can attain rapid cooling by evaporation of water.

In the step (b) which removes the substantial portion of the plasticizer, in order to remove a plasticizer, an extracting solvent is used. It is preferable that the extracting solvent is a poor solvent for the thermoplastic resin and is a good solvent for the plasticizer, and the boiling point thereof is lower than the melting point of microporous membrane. Examples of such an extracting solvent include hydrocarbons such as hexane and cyclohexane; halogenated hydrocarbons such as methylene chloride and 1,1,1-trichloroethane; alcohols such as ethanol and isopropanol; ethers such as diethyl ether and tetrahydrofuran; ketones such as acetone and 2-butanone; or water.

In the present invention, the first method of removing a plasticizer is performed by immersing and fully washing the microporous membrane cut off in the predetermined size in a container containing an extracting solvent and making the adhering solvent air-dried or dried by hot air. Under the present circumstances, the immersing and washing operations are preferably repeated many times since the plasticizer remaining in the microporous membrane will decrease accordingly. It is preferable to constrain the ends of the microporous membrane, which suppresses contraction of the microporous membrane during a series of operations of immersion, washing and drying.

The second method of removing a plasticizer comprises continuously feeding the microporous membrane into a bath filled with an extracting solvent, immersing the membrane in the tub over sufficient time to remove a plasticizer, and then drying the solvent adhered to the membrane. Under the present circumstances, it is preferable to apply well-known techniques such as a multi-stage method in which the inside of the tub is divided into plural stages and the microporous membranes are fed one by one into each tub having different concentrations, or a counter-flow method in which the extracting solvent is supplied in the direction opposite to the running direction of the microporous membrane, and thereby a concentration gradation is provided, in order to enhance extraction efficiency. It is important that a plasticizer is removed from the microporous membrane substantially in either of the first and second methods. Removing substantially means that the plasticizer in the microporous membrane is removed to an extent which does not spoil the performance as a separation membrane and the amount of the plasticizer remaining in the microporous membrane is preferably 1 wt % or less, more preferably 100 mass ppm or less. The quantification of the amount of the plasticizer which remains in the microporous membrane can be carried out by gas chromatography, liquid chromatography, etc. It is further preferable to raise the temperature of the extracting solvent to a temperature lower than the boiling point of the solvent, preferably in the range of not higher than (the boiling point —5° C.), since the diffusion of the plasticizer and the solvent can be promoted, and the extraction efficiency is improved.

In the present invention, the microporous membrane may be heat-treated before, or after, or both before and after the step for removing a plasticizer, which provides effects such as reduction of contraction of the microporous membrane at the time of removing a plasticizer, improvement in the strength and improvement in heat resistance of the microporous membrane. There are some methods of performing heat-treatment such as a method of disposing the microporous membrane in a hot air, a method of immersing the microporous membrane in a heat medium, or a method of contacting the microporous membrane with a metal roll which has been heated and heat-controlled. When the size is fixed and the membrane is heat-treated, particularly, blockades of minute holes can be prevented and therefore such a method is preferable.

Although the temperature of heat-treatment varies depending on the purpose and the melting point of the thermoplastic resin, in the case of the vinylidene fluoride membrane used for a virus removal, 121 to 175° C. is preferable, more preferably 125 to 170° C. The temperature 121° C. is used by general high-pressure steamy sterilization, and the contraction and modification during high-pressure steamy sterilization can be prevented if heat-treatment is conducted at this temperature or higher. If the temperature exceeds 175° C., which is close to the melting point of vinylidene fluoride, disadvantages may occur, for example, the membrane may be ruptured or minute pores may be closed during the heat-treatment.

The microporous membrane which consists of a hydrophobic resin excellent in physical strength is excellent in that it can be endured against high filtration pressure as compared with a microporous membrane which consists of hydrophilic resin such as cellulose while the former tends to cause adsorption of a protein or the like, contamination and clogging of the membrane, etc., resulting in a rapid fall of filtration rate. Therefore, when a microporous membrane which consists of a hydrophobic resin is used, it is preferable to impart the membrane with hydrophilicity in order to prevent blockade due to the adsorption of protein, etc. In the production method of the present invention, it is preferable to introduce a hydrophilic functional group into the surface of the pores of the hydrophobic membrane by graft polymerization method, and to reduce adsorptivity such as that of protein.

The graft polymerization method is a reaction in which radicals are generated on the polymer microporous membrane by means such as ionizing radiation and chemical reaction and a monomer is graft polymerized onto the membrane using the radical as a starting point.

In the present invention, although any means can be adopted in order to generate radicals on the polymer microporous membrane, but in order to generate radicals uniformly over the whole membrane, irradiation of ionizing radiation is preferable. As a kind of ionizing radiation, γ-ray, electron beam, β-ray, neutron beam, etc. can be used, but electron beam or γ-ray is most preferable in the implementation on an industrial scale. Ionizing radiation can be obtained from radioactive isotopes such as cobalt 60, strontium 90, and cesium 137, or by X-ray photography equipment, electron beam accelerator, ultraviolet ray irradiation equipment, etc.

The irradiation dose of the ionizing radiation is preferably not less than 1 kGy and not more than 1000 kGy, more preferably not less than 2 kGy and not more than 500 kGy, most preferably not less than 5 kGy and not more than 200 kGy. Radicals are not generated uniformly below 1 kGy while the strength of the membrane may be deteriorated over 1000 kGy.

The graft polymerization method by irradiation of ionizing radiation is generally roughly divided into a pre-irradiation method in which radicals are generated in the membrane and subsequently the membrane is contacted to the reactant compounds and a simultaneous irradiation method in which radicals are generated in the membrane while the membrane is contacted to the reactant compounds. In the present invention, any method can be applied, but the pre-irradiation method is preferable since it generates less amount of oligomers.

A hydrophilic vinyl monomer which has one vinyl group as a reactant compound, and a cross-linking agent used if needed are made to contact with a polymer microporous membrane in which radicals have been generated in the present invention. Although the method of carrying out contact can be performed also either on a gaseous phase or a liquid phase, the method of carrying out contact in a liquid phase in which a graft reaction progresses uniformly is preferable. For the purpose of making the graft reaction still more uniformly, it is preferable that a hydrophilic vinyl monomer which has one vinyl group or a hydrophilic vinyl monomer and a cross-linking agent when a cross-linking agent is used are dissolved in a solvent beforehand and then the contact with a polymer microporous membrane is carried out.

As described above, the hydrophilic microporous membrane of the present invention comprises a polymer microporous membrane on which a hydrophilic vinyl monomer having one vinyl group is graft polymerized to impart the surface of the micropores with hydrophilicity thereby reducing adsorption of physiologically active substances such as protein. The hydrophilic vinyl monomer which has one vinyl group in the present invention is a monomer which has one vinyl group and uniformly dissolves in a pure water of 25° C. when mixed therein at 1 vol % under atmospheric pressure. Examples of the hydrophilic vinyl monomer include vinyl monomers having a hydroxyl group or a functional group used as a precursor thereof such as hydroxypropyl acrylate, hydroxybutyl acrylate; vinyl monomers having an amide bond such as vinyl pyrrolidone; vinyl monomers having an amino group such as acrylics amide; vinyl monomers having a polyethyleneglycol chain such as polyethyleneglycol monoacrylate; vinyl monomers having an anion exchange groups such as triethylammoniumethyl methacrylate; vinyl monomers having a cation exchange groups such as sulfopropyl methacrylate, In the present invention, among the hydrophilic vinyl monomers, the above-described hydrophilic vinyl monomer which has one or more hydroxyl group or a functional group used as a precursor thereof is preferably used since the use thereof reduces a receding contact angle of the membrane. More preferably, esters of acrylic acid or methacrylic acid and a polyhydric alcohol such as hydroxypropyl acrylate and 2-hydroxyethyl methacrylate; alcohols having an unsaturated bond such as allyl alcohol; and enol esters such as vinyl acetate and vinyl propionate are used and most preferably esters of acrylic acid or methacrylic acid and a polyhydric alcohol such as hydroxypropyl acrylate and 2-hydroxyethyl methacrylate are used. The hydrophilic microporous membrane to which hydroxypropyl acrylate is grafted has a low receding contact angle and provides a sufficient globulin permeating ability.

A vinyl monomer which has two or more vinyl groups has a tendency to perform cross-linking in the hydrophilic diffusive layer through copolymerization and reduce the permeability of protein even if it is hydrophilic, and accordingly it is not preferable from the viewpoint of protein permeativity, but it is possible to use such a monomer if needed as a cross-linking agent since it has an effect of preventing adherence between membranes and reducing dissolution-out from the membrane.

The vinyl monomer which has two or more vinyl groups used as a cross-linking agent is advantageous when the receding contact angle is lower taking into consideration the adsorptivity of the micropore surfaces for protein and therefore it is preferable to use a hydrophilic cross-linking agent. The hydrophilic cross-linking agent is a monomer which has two or more vinyl groups and uniformly dissolves in a pure water of 25° C. when mixed therein at 1 vol % under atmospheric pressure.

When such a cross-linking agent, i.e., vinyl monomer which has two or more vinyl groups is used, it is copolymerized at a proportion to the hydrophilic vinyl monomer which has one vinyl group of preferably 10 mol% or less, more preferably 0.01 to 10 mol %, further preferably 0.01 to 7 mol % and most preferably 0.01 to 5 mol %. The permeability of protein is not enough if it exceeds 10 mol %.

The cross-linking agent used in the present invention has preferably a number average molecular weight of 200 or more and 2000 or less, more preferably a number average molecular weight of 250 or more and 1000 or less, most preferably a number average molecular weight of 300 or more and 600 or less. It is preferable from the viewpoint of the filtration rate of a protein solution that the number average molecular weight of the cross-linking agent is 200 or more and 2000 or less.

Specific examples of the cross-linking agent used in the present invention, i.e., the vinyl monomer which has two or more vinyl groups, include, for example, ethylene glycol dimethacrylate, polyethylene glycol dimethacrylate, ethylene glycol diacrylate, polyethylene glycol diacrylate, etc., and as other vinyl monomer which has two or more vinyl groups, cross-linking agents having three reactive groups such as divinylbenzene derivatives and trimethylolpropane trimethacrylate can also be used. Although these cross-linking agents can also be used as a mixture of two or more kinds of compounds, it is preferable that they are hydrophilic. Polyethylene glycol diacrylate is particularly preferable from the viewpoint of the receding contact angle or protein permeativity.

A solvent which dissolves the hydrophilic vinyl monomer which has one vinyl group, and the cross-linking agent used if needed is not particularly limited as long as the uniform dissolution can be carried out. Examples of such a solvent include alcohols such as ethanol, and isopropanol, t-butyl alcohol; ethers such as diethyl ether and tetrahydrofuran; and ketones such as acetone and 2-butanone; water or a mixture thereof.

The concentration of a hydrophilic vinyl monomer which has one vinyl group, and the cross-linking agent used if needed at the time of dissolving them is preferably from 3 vol % to 30 vol %, more preferably from 3 vol % to 20 vol %, most preferably from 3 vol % to 15 vol %. When it is a concentration not less than 3 vol %, sufficient hydrophilicity can be obtained and such a concentration is preferable. If it exceeds 30 vol %, the micropores may be filled with the hydrophilized layer and there is a tendency that permeation capability is deteriorated and therefore such a concentration is not preferable.

The amount of the reaction liquid in which the hydrophilic vinyl monomer which has one vinyl group and the cross-linking agent used if needed are dissolved in a solvent used at the time of graft polymerization is preferably $1 \times 10^{-5}$ m$^3$ to $1 \times 10^{-3}$ m$^3$ per 1 g of the polymer microporous membrane. If the amount of the reaction liquid is $1 \times 10^{-5}$ m$^3$ to $1 \times 10^{-3}$ m$^3$, membranes with enough homogeneity can be obtained.

The reaction temperature at the time of graft polymerization is not particularly limited, although generally carried out at 20° C. to 80° C.

The present invention introduces the optimal hydrophilized layer to a hydrophobic microporous membrane, and realizes high protein permeativity. The ratio of the graft grafted to the hydrophobic microporous membrane for this purpose is preferably 3% or more and 50% or less, more preferably 4% or more and 40% or less, and most preferably 6% or more and 30% or less. If the graft ratio is less than 3%, hydrophilicity of the membrane runs short and a rapid fall in the filtration rate resulting from adsorption of protein is caused. If it exceeds 50%, relatively small pores will be filled with the hydrophilized layer and sufficient filtration rate cannot be obtained. The graft ratio as used herein is a value defined by the following formula:

Graft ratio (%)=100×((membrane mass after grafted−membrane mass before grafted)/membrane mass before grafted)

To the composition which constitutes the hydrophilic microporous membrane of the present invention may be further blended, according to the purpose, additives such as anti-oxidant, crystal core agent, antistatic agent, flame retardant, lubricant, and ultraviolet ray absorbent if necessary.

The hydrophilic microporous membrane which has a heat resistance of the present invention can be used for a wide range of applications including a separation membrane for medical use such as for removing, concentrating or as a culture medium of a virus, bacterium, etc., a filter for industrial processes which removes particles from a pharmaceutical liquid or processed water, etc., a separation membrane for oil-water separation or liquid-gas separation, a separation membrane aiming at purification of city water and sewerage, and a separator for lithium ion battery, and a support for solid electrolyte polymer batteries.

Hereafter, the present invention will be described in detail by way of Examples but the present invention is not limited thereto. The testing methods shown in Examples are as follows.

(1) Outer Diameter, Inner Diameter of Hollow Fiber, Thickness of Membrane

The outer diameter, inner diameter of a hollow fiber is determined by photographing the perpendicular section of the membrane at 210 times magnification using a substance microscope (SCOPEMAN503, product of Moriteq Co., Ltd.). The thickness of the membrane was calculated as ½ of the difference of the outer diameter and the inner diameter of a hollow fiber.

(2) Porosity

The volume and mass of the microporous membrane were measured and the void ratio was calculated using the following formula from the obtained results.

Porosity (%)=(1−mass/(density×volume of resin))×100

(3) Water Permeativity

The volume of permeated pure water at 25° C. was measured by constant-pressure dead-end filtration and the water permeativity was calculated as the following formula from the area of the membrane, filtration pressure (0.1 MPa) and filtration time.

Water permeativity (m$^3$/m$^2$/second/Pa)=permeation volume/(area of membrane×differential pressure×filtration time)

(4) Maximum Pore Size

The bubble point (Pa) which can be determined by the bubble point method based on ASTM F 316-86 was converted to the maximum pore size (nm). As a testing liquid in which the membrane is immersed, a fluorocarbon liquid having a surface tension of 12 mN/m (Perfluorocarbon coolant FX-3250 (trademark), product of Sumitomo 3M) was used. The bubble point was determined by setting a hollow fiber having an effective length of 8 cm in a bubble point measurement equipment, gradually raising the pressure of the hollow side and reading the pressure when the gas flow rate permeating the membrane reaches 2.4 E-3 liter/min.

(5) Structure Observation of Microporous Membrane

The microporous membrane cut off in a suitable size was fixed onto the sample stand with a conductive double-sided tape, and coated with gold to prepare a sample for microscopic observation. A high resolution scanning electron microscope (HRSEM) (S-900, product of Hitachi, Ltd.) was used and structure observation of the surface and a section of the microporous membrane was performed at an acceleration voltage of 5.0 kV and predetermined magnification.

(6) Open Pore Ratio and Average Open Pore Ratio

The open pore ratio was determined by dividing the observation result of the cross-sectional structure of the microporous membrane in the thickness direction for every 1 μm thickness, and obtaining as an area ratio of void to each divided region by image-processing analysis. Electron microscope photography at this time was performed at 15,000 times magnification. The average open pore ratio is the average value of open pore ratio measured for the whole membrane thickness.

(7) Thickness of Coarse Structure Layer and Ratio of Fine Structure Layer to the Whole Thickness of Membrane In the measurement of the above open pore ratio, it was judged whether each divided region agreed with the definition of the fine structure layer defined and the coarse structure layer as described. That is, the coarse structure layer is a continuous region existing adjacent to the membrane surface and in which the open pore ratio measured in the thickness direction is higher by 2% or more than the average value of the open pore ratio for the whole membrane thickness, and the fine structure layer is a region other than the coarse structure layer and in which the open pore ratio measured in the thickness direction is within the range of less than ±2% of the average value of the open pore ratio for the region excluding the coarse structure layer. The ratio of the fine structure layer to the whole thickness of membrane is a value obtained by dividing the sum of the thicknesses of the agreeing regions by the whole membrane thickness.

(8) Average Pore Size of the Coarse Structure Layer Side Surface

From the structure observation result of the coarse structure layer side surface, the number and area of pores which exist in the surface were measured by image-processing analysis, and a circle equivalent diameter of the pore was determined from the average area per pore assuming that the pore is a true circle. This circle equivalent diameter was regarded as the average pore size of the coarse structure layer side surface. Electron microscope (S-900, product of Hitachi, Ltd.) photography at this time was performed at 6,000 times magnification.

(9) Measurement of Contact Angle on Membrane

The receding contact angle of the water on the membrane was measured by using a water for injection (product of Otsuka Pharmaceutical Co., Ltd.; Japanese Pharmacopoeia) with the dynamic contact angle measuring instrument (DCAT11, product of DataPhysics Instruments GmbH). A hollow fiber membrane was cut to about 2 cm, and mounted on the equipment. The receding contact angle was measured using the principle of the Wilhelmy method. The motor speed at the time of measurement was 0.10 mm/second, the immersing depth was 10 mm, and 5-cycle measurement was carried out by regarding the advance and retreat as one cycle. The receding contact angle used was the average value of the value acquired by 5 measurements.

(10) Amount of Adsorption of Bovine Immunoglobulin

The bovine immunoglobulin solution from Life Technology, Ltd. was diluted with a physiological saline solution (product of Otsuka Pharmaceutical Co., Ltd.; Japanese Pharmacopoeia) to a concentration of 0.01 wt %, and this was used as a source solution for filtration. The source solution for filtration was subjected to constant-pressure dead-end filtration under a filtration pressure of 0.3 MPa and a filtration temperature of 25° C., and the filtrate at 50 liter/m$^2$ from the start of filtration was sampled. Absorption at a wavelength of 280 nm was measured for the source solution for filtration and the filtrate, and the amount of adsorption of bovine immunoglobulin was calculated from the following formula.

Amount of adsorption of bovine immunoglobulin (mg/g)=(absorption of source solution for filtration−absorption of filtrate)/absorption of source solution for filtration×0.005/membrane weight

(11) Filtration Test of 3 wt % Bovine Immunoglobulin Solution

The bovine immunoglobulin solution from Life Technology, Ltd. was diluted with a physiological saline solution (product of Otsuka Pharmaceutical Co., Ltd.; Japanese Pharmacopoeia) to a concentration of 3 wt %, and this was pre-filtered further by the filtration membrane (product of Asahi Kasei Corporation, PLANOVA35N) for removing impurities and then used as a source solution for filtration. As a result of measuring the molecular weight distribution of the bovine immunoglobulin in this source solution for filtration using liquid chromatography (product of TOSOH CORP., CCP&8020 series, product of Amersham Biosciences Company, Superdex by 200 HR 10/30), the ratio of polymer of dimer or larger was not more than 20 wt %. Constant-pressure dead-end filtration was performed for this source solution for filtration on conditions of a filtration pressure of 0.3 MPa and a filtration temperature of 25° C., and the permeation rate for 5 minutes after the start of filtration and for 55 to 60 minutes after the start of filtration (liter/m$^2$/h) was measured.

(12) Logarithmic Reduction Value of Porcine Parvovirus

As a source solution for filtration, supernatant of a culture solution of ESK cell (pig kidney cell) cultured in a Dulbecco's MEM culture-medium solution (product of Nihon Biopharmaceutical Research Institute) supplemented with 5% fetal bovine serum (product of Upstate, Ltd.) and infected with porcine parvovirus was used after pre-filtered by microporous membrane (product of Asahi Kasei Corporation, PLANOVA35N). Constant-pressure dead-end filtration was performed for this source solution for filtration under the condition of a filtration pressure of 0.3 MPa and a filtration temperature of 25° C. The filtrate was sampled as 11 fractions for every 5 ml (5 liter/m$^2$), and in order to measure the logarithmic removing rate of porcine parvovirus at the time point by which 55 liter/m$^2$ has been filtered from the start of filtration, 1 ml was respectively sampled from each fraction and mixed. The concentration of the porcine parvovirus in the source solution for filtration and the filtrate (the mixed solution and the first and the last fractions) was determined by $TCID_{50}$ measuring method using agglutination reaction of chicken fresh erythrocyte (product of Nippon Biotest Laboratories, Inc.) after adding each liquid to ESK cell and culturing 10 days.

EXAMPLE 1

After a composition consisting of 49 wt % of polyvinylidene fluoride resin (SOLEF1012, product of SOLVAY Company, Crystal melting point: 173° C.) and 51 wt % of dicyclohexyl phthalate (product of Osaka Organic Chemical Industry, Ltd., industrial grade product) was churned and mixed at 70° C. using a Henschel mixer, the mixture was cooled into the shape of a powder and was supplied from the hopper and melt-blended using a two-axis extruder (Laboplast mill MODEL 50C 150, product of Toyo Seiki Seisaku- Sho, Ltd.) at 210° C. so that the mixture was homogeneously dissolved. Then, the solution was extruded in the shape of a hollow fiber from a spinneret which consists of an annular orifice with an inner diameter of 0.8 mm and an outer diameter of 1.1 mm at a discharging rate of 17 m/min while passing through the inside hollow part dibutyl phthalate (product of Sanken Kakoh Company) at a temperature of 130° C. at a rate of 8 ml/min. The extruded solution was cooled and solidified in a water bath heat-controlled to 40° C. and rolled up to a spinner at a rate of 60 m/min. Then dicyclohexyl phthalate and dibutyl phthalate were extracted and removed with 99% methanol modified ethanol (product of Imazu Chemical Co., Ltd., industrial grade product) and the attached ethanol was replaced with water, and a heat-treatment at 125° C. was conducted for 1 hour using high-pressure steamy sterilization equipment (HV-85, product of Hirayama Factory, Ltd.) in the state where it was immersed in water. Then, after replacing attached water with ethanol, hollow fiber microporous membrane was obtained by drying at a temperature of 60° C. in the oven. In order to prevent contraction during the steps from the extraction step to drying step, the membrane was fixed in a fixed size state and processed.

Then, hydrophilizing treatment by the graft method was performed to the above microporous membrane. Hydroxypropyl acrylate (product of Tokyo Chemicals, Ltd., reagent grade) was dissolved in 25 vol % solution of 3-butanol (Pure Science, Ltd., special reagent grade) so that the former might be 8 vol %. The mixture was held at 40° C. while subjected to nitrogen bubbling for 20 minutes, and then used as a reaction liquid. First, 100 kGy irradiation of γ-ray was carried out by using Co60 as a radiation source, while cooling the microporous membrane at —60° C. with dry ice under nitrogen atmosphere. After allowing to stand still the irradiated membrane-under a reduced pressure of 13.4 Pa or less for 15 minutes, it was contacted with the above-described reaction liquid and the membrane was allowed to stand still at 40° C. for 1 hour. Then, the membrane was washed with ethanol, vacuum drying at 60° C. was performed for 4 hours, and the microporous membrane was obtained. It was confirmed that water spontaneously permeates into the pores when the obtained membrane was contacted with water. As a result of evaluating the performance of the obtained membrane, high performance was shown as in Table 1.

EXAMPLE 2

A hollow fiber microporous membrane was obtained according to Example 1 except that a composition consisting of 39 wt % of polyvinylidene fluoride resin and 61 wt % of dicyclohexyl phthalate was extruded from a spinneret which consists of an annular orifice with an inner diameter of 0.8 mm and an outer diameter of 1.2 mm.

Then, the above microporous membrane was subjected to hydrophilizing treatment according to Example 1. As a result of evaluating the performance of the obtained membrane, high performance was shown as in Table 1.

EXAMPLE 3

A hollow fiber microporous membrane was obtained according to Example 2 except that a composition consisting of 46 wt % of polyvinylidene fluoride resin and 54 wt % of dicyclohexyl phthalate was homogeneously dissolved and the solution was extruded in the shape of a hollow fiber from a spinneret which consists of an annular orifice with an inner diameter of 0.8 mm and an outer diameter of 1.2 mm at a discharging rate of 5.5 m/min while passing through the inside hollow part diphenylcresyl phosphate (product of Daihachi Chemical Industry Co., Ltd., industrial grade product) at a rate of 7 ml/min.

Then, the above microporous membrane was subjected to hydrophilizing treatment according to Example 1. As a result of evaluating the performance of the obtained membrane, high performance was shown as in Table 1.

EXAMPLE 4

Hydrophilizing treatment was performed to the membrane obtained in Example 1. The hydrophilizing treatment was performed according to Example 1 except that 7.52 vol % of hydroxypropyl acrylate, 0.15 vol % (1 mol % to hydroxypropyl acrylate) of polyethylene glycol diacrylate (product of Aldrich Co., average molecular weight 258) and 0.33 vol % (1 mol % to hydroxypropyl acrylate) of polyethylene glycol diacrylate (product of Aldrich Co., average molecular weight 575) were dissolved in 25 vol % solution of 3-butanol and used as a reaction liquid. As a result of evaluating the performance of the obtained membrane, high performance was shown as in Table 1.

EXAMPLE 5

Hydrophilizing treatment was performed to the membrane obtained in Example 1. The hydrophilizing treatment was performed according to Example 1 except that 4-hydroxybutyl acrylate (product of Tokyo Chemicals Industry) was dissolved in 25 vol % solution of 3-butanol so that the former might be 8 vol % and used as a reaction liquid. As a result of evaluating the performance of the obtained membrane, high performance was shown as in Table 2.

EXAMPLE 6

A hollow fiber microporous membrane was obtained according to Example 1 except that a composition consisting of 48 wt % of polyvinylidene fluoride resin and 52 wt % of dicyclohexyl phthalate was homogeneously dissolved and the solution was extruded in the shape of a hollow fiber from a spinneret which consists of an annular orifice with an inner diameter of 0.8 mm and an outer diameter of 1.05 mm at a discharging rate of 20 m/min while passing through the inside hollow part dibutyl phthalate at a rate of 10 ml/min. Then, the above microporous membrane was subjected to hydrophilizing treatment according to Example 1. As a result of evaluating the performance of the obtained membrane, high performance was shown as in Table 2.

EXAMPLE 7

A hollow fiber microporous membrane was obtained according to Example 1 except that a composition consisting of 50 wt % of polyvinylidene fluoride resin and 50 wt % of dicyclohexyl phthalate was used.

Then, the above microporous membrane was subjected to hydrophilizing treatment according to Example 1. As a result of evaluating the performance of the obtained membrane, high performance was shown as in Table 2.

COMPARATIVE EXAMPLE 1

Hydrophilizing treatment was performed to the membrane obtained in Example 1 according to Example 1 except that 1.23 vol % of hydroxypropyl acrylate, 0.61 vol % (25 mol % to hydroxypropyl acrylate) of polyethylene glycol diacrylate (product of Aldrich Co., average molecular weight 258), 1.36 vol % (25 mol % to hydroxypropyl acrylate) of polyethylene glycol diacrylate (product of Aldrich Co., average molecular weight 575) was dissolved in 25 vol % solution of 3-butanol and used as a reaction liquid. As a result of evaluating the performance of the obtained membrane, as shown in Table 3 it turns out that the decrease in the filtration rate of 3% bovine immunoglobulin solution with time is remarkable. It is considered that this was because the hydrophilizing treatment was performed using a reaction liquid containing a lot of cross-linking agent, and even though a sufficient coarse structure layer for the membrane exists, the filtration rate was reduced by adsorption of globulin.

COMPARATIVE EXAMPLE 2

A hollow fiber microporous membrane was obtained according to Example 1 except that a composition consisting of polyvinylidene fluoride resin and dicyclohexyl phthalate was homogeneously dissolved and the solution was extruded in the shape of a hollow fiber from a spinneret which consists of an annular orifice with an inner diameter of 0.8 mm and an outer diameter of 1.2 mm at a discharging rate of 5.5 m/min while passing through the inside hollow part diheptyl phthalate at a rate of 7 ml/min.

Then, the above microporous membrane was subjected to hydrophilizing treatment. The hydrophilizing treatment was performed according to Example 1 except that hydroxypropyl acrylate and polyethylene glycol dimethacrylate (product of Aldrich Co., average molecular weight 550) was dissolved in 25 vol % solution of 3-butanol so that the acrylate and the dimethacrylate might respectively be 1.1 vol % and 0.6 vol %. It was confirmed that water spontaneously permeates into the pores when the obtained membrane was contacted with water. As a result of evaluating the performance of the obtained membrane, as shown in Table 3 it turns out that the permeation ability of 3% bovine globulin was very low.

EXAMPLE 8

As a result of evaluating the removing ability of porcine parvovirus of the hydrophilic microporous membrane obtained in Example 1, high performance was exhibited as shown in Table 4.

EXAMPLE 9

As a result of evaluating the removing ability of porcine parvovirus of the hydrophilic microporous membrane obtained in Example 4, high performance was exhibited as shown in Table 4.

EXAMPLE 10

As a result of evaluating the removing ability of porcine parvovirus of the hydrophilic microporous membrane obtained in Example 5, high performance was exhibited as shown in Table 4.

EXAMPLE 11

As a result of evaluating the removing ability of porcine parvovirus of the hydrophilic microporous membrane obtained in Example 6, high performance was exhibited as shown in Table 4.

EXAMPLE 12

As a result of evaluating the removing ability of porcine parvovirus of the hydrophilic microporous membrane obtained in Example 7, high performance was exhibited as shown in Table 4.

TABLE 1

| Items | Example 1 | Example 2 | Example 3 | Example 4 |
| --- | --- | --- | --- | --- |
| Form of microporous membrane | Hollow fiber | Hollow fiber | Hollow fiber | Hollow fiber |
| Inner diameter (μm) | 326 | 331 | 301 | 326 |
| Thickness of membrane (μm) | 72 | 70 | 30 | 72 |
| Thickness of coarse structure layer (μm) | 16 | 14 | 3 | 16 |
| Ratio of fine structure layer (%) | 76 | 80 | 90 | 76 |
| Graft ratio (%) | 12 | 11 | 10 | 10 |
| Maximum pore size (nm) | 32 | 51 | 38 | 32 |
| Water permeativity ($m^3/m^2$/second/Pa) | 8.3E-11 | 2.3E-10 | 2.4E-10 | 7.7E-11 |
| Receding contact angle (deg) | 0 | 0 | 0 | 0 |
| Amount of adsorption of globulin (mg/g) | 0 | 0 | 0 | 0 |
| Globulin permeation rate A (liter/$m^2$/h) | 60 | 172 | 86 | 48 |
| Globulin permeation rate B (liter/$m^2$/h) | 46 | 151 | 26 | 21 |
| B/A | 0.77 | 0.88 | 0.30 | 0.44 |
| Permeation volume of 3 wt % bovine immunoglobulin solution (liter/$m^2$/h) | 122 | | | |

TABLE 2

| Items | Example 5 | Example 6 | Example 7 |
| --- | --- | --- | --- |
| Form of microporous membrane | Hollow fiber | Hollow fiber | Hollow fiber |
| Inner diameter (μm) | 326 | 347 | 332 |
| Thickness of membrane (μm) | 72 | 65 | 70 |
| Thickness of coarse structure layer (μm) | 16 | 15 | 15 |
| Ratio of fine structure layer (%) | 76 | 77 | 77 |
| Graft ratio (%) | 24 | 12 | 12 |
| Maximum pore size (nm) | 32 | 35 | 30 |

TABLE 2-continued

| Items | Example 5 | Example 6 | Example 7 |
|---|---|---|---|
| Water permeativity ($m^3/m^2$/second/Pa) | 9.0E-11 | 8.5E-11 | 6.2E-11 |
| Receding contact angle (deg) | 8.13 | 0 | 0 |
| Amount of adsorption of globulin (mg/g) | 0 | 0 | 0 |
| Globulin permeation rate A (liter/$m^2$/h) | 48 | 61 | 54 |
| Globulin permeation rate B (liter/$m^2$/h) | 23 | 49 | 30 |
| B/A | 0.48 | 0.80 | 0.55 |
| Permeation volume of 3 wt % bovine immunoglobulin solution (liter/$m^2$/h) | | 140 | 79 |

TABLE 3

| Items | Comparative Example 1 | Comparative Example 1 |
|---|---|---|
| Form of microporous membrane | Hollow fiber | Hollow fiber |
| Inner diameter (μm) | 326 | 302 |
| Thickness of membrane (μm) | 72 | 34 |
| Thickness of coarse structure layer (μm) | 16 | 6 |
| Ratio of fine structure layer (%) | 76 | 82 |
| Graft ratio (%) | 8 | 10 |
| Maximum pore size (nm) | 32 | 33 |
| Water permeativity ($m^3/m^2$/second/Pa) | 9.1E-11 | 8.2E-11 |
| Receding contact angle (deg) | 23.2 | 0 |
| Amount of adsorption of globulin (mg/g) | 0 | 0 |
| Globulin permeation rate A (liter/$m^2$/h) | 54 | 87 |
| Globulin permeation rate B (liter/$m^2$/h) | 8 | 8 |
| B/A | 0.15 | 0.09 |

TABLE 4

| Items | Example 8 | Example 9 | Example 10 | Example 11 | Example 12 |
|---|---|---|---|---|---|
| Logarithmic reduction value of porcine parvovirus (0 to 55 liter/$m^2$ filtered time) | 5.3 | 4.2 | 4.9 | 3.8 | 5.6 |
| Logarithmic reduction value of porcine parvovirus (0 to 5 liter/$m^2$ filtered time) | >6.6 | >6.6 | >6.6 | >6.6 | >6.6 |
| Logarithmic reduction value of porcine parvovirus (50 to 55 liter/$m^2$ filtered time) | 3.8 | 3.6 | 3.7 | 3.4 | 4.4 |

INDUSTRIAL APPLICABILITY

According to the hydrophilic microporous membrane of the present invention, a separation membrane can be provided which can attain both virus removal performance and permeation capability of physiologically active substances on a practical level in the filtration of medical supplies which may have a risk of virus contamination or physiologically active substance solution which is the material thereof.

The invention claimed is:

1. A hydrophilic microporous membrane comprising a thermoplastic resin, having been contacted with a hydrophilic vinyl monomer having one vinyl group after generation of radicals by irradiation with ionizing radiation in order to be subjected to hydrophilizing treatment by a graft polymerization reaction, and having a maximum pore size of 10 to 100 nm, wherein said hydrophilic microporous membrane has a coarse structure layer with a higher open pore ratio and a fine structure layer with a lower open pore ratio which are formed in one piece, wherein said coarse structure layer exists on at least one side of the membrane surface and has a thickness of 2 μm or more and a thickness of said fine structure layer is 50% or more of the whole membrane thickness, wherein when 3 wt % bovine immunoglobulin having a monomer ratio of 80 wt % or more is filtered at a constant pressure of 0.3 MPa, an average globulin permeation rate A (liter/$m^2$/h) for 5 minutes from the start of filtration satisfies the following formula (1) and an average globulin permeation rate B (liter/$m^2$/h) for 5 minutes from the time point of 55 minutes after the start of filtration satisfies the following formula (2):

$$\text{Globulin permeation rate } A > 0.0015 \text{ maximum pore size (nm)}^{2.75} \quad (1)$$

$$\text{Globulin permeation rate } B/\text{globulin permeation rate } A > 0.2 \quad (2).$$

2. The hydrophilic microporous membrane according to claim 1 having a maximum pore size of 10 to 70 nm.

3. The hydrophilic microporous membrane according to claim 2 having a receding contact angle of water of 0 to 20 degrees.

4. The hydrophilic microporous membrane according to claim 1 having a maximum pore size of 10 to 36 nm.

5. The hydrophilic microporous membrane according to claim 4 having a receding contact angle of water of 0 to 20 degrees.

6. The hydrophilic microporous membrane according to claim 4, wherein an accumulated permeation volume in three hours after the start of filtration is 50 liter/$m^2$ or more when 3 wt % bovine immunoglobulin having a monomer ratio of 80 wt % or more is filtered at a constant pressure of 0.3 MPa.

7. The hydrophilic microporous membrane according to claim 1 having a receding contact angle of water of 0 to 20 degrees.

8. The hydrophilic microporous membrane according to claim 1, wherein a logarithmic reduction value of porcine parvovirus at the time point by which 55 liter/$m^2$ has been permeated from the start of filtration is 3 or more.

9. The hydrophilic microporous membrane according to claim 1, wherein both of a logarithmic reduction value of porcine parvovirus at the time point by which 5 liter/m² has been permeated from the start of filtration and a logarithmic reduction value of porcine parvovirus at the time point by which further 5 liter/m² has been permeated after 50 liter/m² is permeated are 3 or more.

10. The hydrophilic microporous membrane according to claim 9, wherein an accumulated permeation volume in three hours after the start of filtration is 50 liter/m² or more when 3 wt % bovine immunoglobulin having a monomer ratio of 80 wt % or more is filtered at a constant pressure of 0.3 MPa.

11. The hydrophilic microporous membrane according to claim 1, wherein an accumulated permeation volume in three hours after the start of filtration is 50 liter/m² or more when 3 wt % bovine immunoglobulin having a monomer ratio of 80 wt % or more is filtered at a constant pressure of 0.3 MPa.

12. The hydrophilic microporous membrane according to claim 1, wherein the thickness of the coarse structure layer is 3 µm or more.

13. The hydrophilic microporous membrane according to claim 1, wherein the thickness of the coarse structure layer is 5 µm or more.

14. The hydrophilic microporous membrane according to claim 1, wherein the thermoplastic resin is polyvinylidene fluoride.

15. The hydrophilic microporous membrane according to claim 1, wherein the hydrophilizing treatment is a graft polymerization reaction of a hydrophilic vinyl monomer having one vinyl group to the surface of the pores of the hydrophilic microporous membrane.

16. The hydrophilic microporous membrane according to claim 15, wherein the hydrophilic vinyl monomer contains a hydroxyl group.

17. The hydrophilic microporous membrane according to claim 1, wherein the adsorption amount per 1 g of the membrane is 3 mg or less when dead-end filtration at a constant pressure of 0.3 MPa is performed using a 0.01 wt % bovine immunoglobulin solution and a filtrate of 50 liter/m² from the start of filtration is collected.

18. A method for removing a virus from a liquid containing a physiologically active substance, comprising filtering the liquid through the hydrophilic microporous membrane according to claim 1.

* * * * *

UNITED STATES PATENT AND TRADEMARK OFFICE
CERTIFICATE OF CORRECTION

| | |
|---|---|
| PATENT NO. | : 7,459,085 B2 |
| APPLICATION NO. | : 10/531568 |
| DATED | : December 2, 2008 |
| INVENTOR(S) | : Ichiro Koguma et al. |

It is certified that error appears in the above-identified patent and that said Letters Patent is hereby corrected as shown below:

On the Title Page

Item (*) Notice: Subject to any disclaimer, the term of this patent is extended or adjusted under 35 U.S.C. 154(b) by 609 days.

Please add:

**\*\* This patent is subject to a terminal disclaimer \*\***

Signed and Sealed this

Second Day of June, 2009

JOHN DOLL
*Acting Director of the United States Patent and Trademark Office*